(12) United States Patent
Laurent et al.

(10) Patent No.: US 6,657,356 B2
(45) Date of Patent: Dec. 2, 2003

(54) STATOR FOR AN ELECTRICAL ROTATING MACHINE

(75) Inventors: Daniel Laurent, Marly (CH); Giancarlo Pegoraro, St-Legier (CH); Jean-Louis Linda, La Tour-de-Trême (CH); Fernand Genoud, Remaufens (CH)

(73) Assignee: Conception et Developpement Michelin S.A., Givisiez (CH)

( * ) Notice: Subject to any disclaimer, the term of this patent is extended or adjusted under 35 U.S.C. 154(b) by 0 days.

(21) Appl. No.: 09/907,285

(22) Filed: Jul. 17, 2001

(65) Prior Publication Data

US 2002/0047473 A1 Apr. 25, 2002

(30) Foreign Application Priority Data

Jul. 17, 2000 (FR) .............................. 00 09370

(51) Int. Cl.$^7$ ................................. H02K 1/12
(52) U.S. Cl. .................. 310/254; 310/258; 310/64; 310/216; 310/42
(58) Field of Search ................. 310/254, 258, 310/259, 216, 217, 218, 42, 43, 54, 57, 59

(56) References Cited

U.S. PATENT DOCUMENTS

| | | | | |
|---|---|---|---|---|
| 4,852,245 A | * | 8/1989 | Denk | 29/596 |
| 4,908,347 A | * | 3/1990 | Denk | 505/1 |
| 4,968,911 A | * | 11/1990 | Denk | 310/42 |

* cited by examiner

Primary Examiner—Thanh Lam

(57) ABSTRACT

An electrical rotating machine in which the laminated magnetic circuit of an external stator includes a stack of yokes each made from a magnetic metal sheet and disposed substantially parallel to a plane perpendicular to the axis and a plurality of teeth disposed inside the yokes, the teeth each being made from a magnetic metal sheet and disposed substantially parallel to a plane perpendicular to the axis, the teeth being stacked and the stacks of teeth delimiting slots, the teeth being bound with the yokes by gluing with resin.

22 Claims, 9 Drawing Sheets

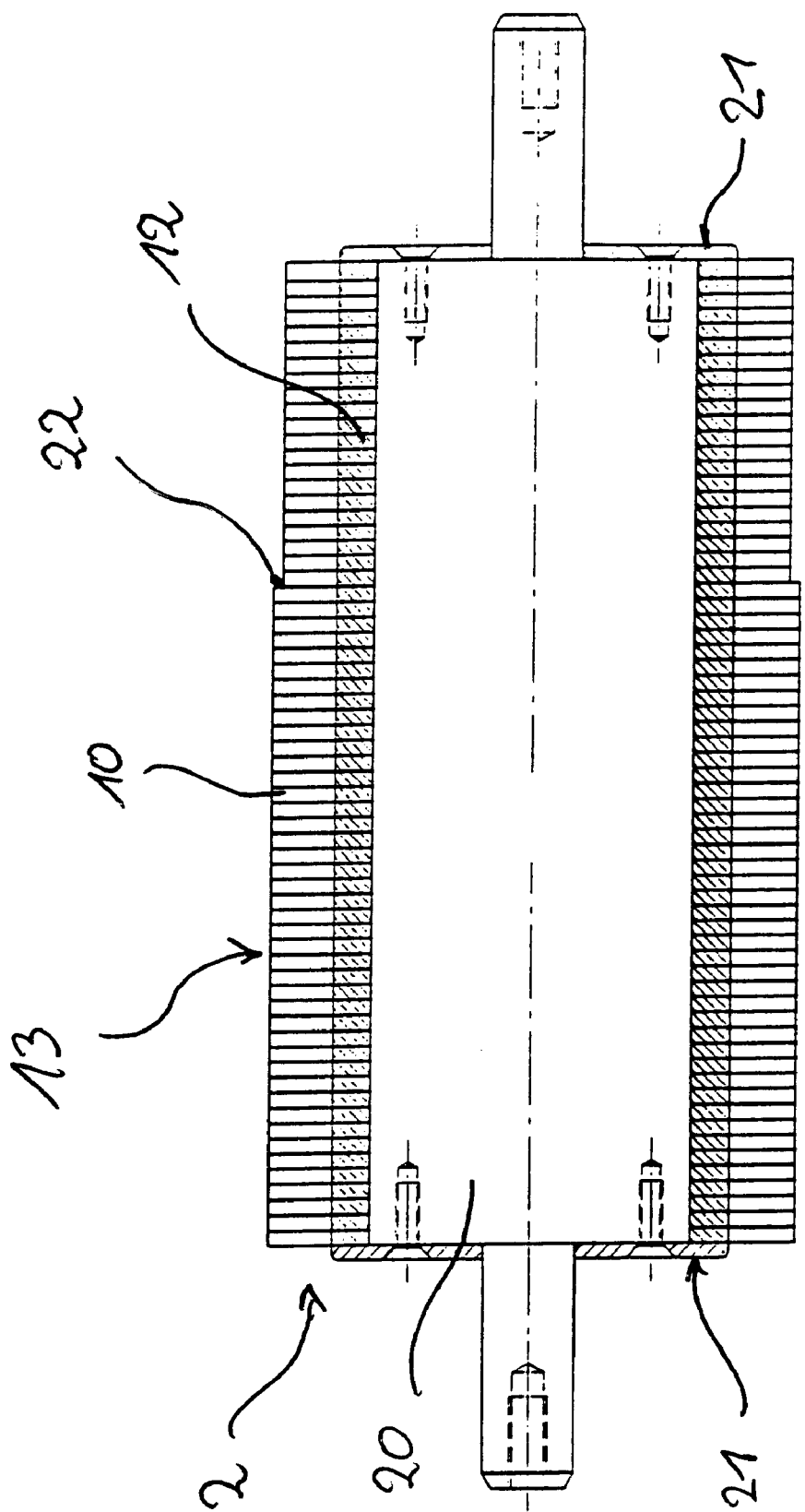

US 6,657,356 B2

STATOR FOR AN ELECTRICAL ROTATING MACHINE

BACKGROUND OF THE INVENTION

The present invention relates to electrical rotating machines, and more particularly to the stator of an electrical machine in which the rotor is located inside the stator.

The stator has a magnetic circuit and windings of electrically conductive wires which in general are made from insulated copper wire, often round in section. The magnetic circuit, for its part, is always laminated; it is formed by a stack of magnetic metal sheets. Each metal sheet is cut to shape such that slots separated by teeth are made, the slots being the seatings for the electrically conductive wires. Each slot is delimited by two substantially radially oriented walls and a slot base, and has an opening, the opening being located on a smaller radius than the radius on which the slot base is located. This principle of arranging the stator is widely applied in synchronous or asynchronous machines.

Installing the electric windings in the slots involves inserting electrical conductors (or sections of electrical conductors) by passing them through the opening of the slot. Consider that, in the type of motor relevant here, this slot opening is oriented towards the inside and is thus hard to access. Moreover, the slot opening is in general quite narrow with respect to the width of the slot. In fact, to arrive at the optimum mechanical and magnetic construction, each tooth ends (on the side with the small radii) in a foot which partly closes the slot opening.

It is thus no simple matter to insert the electrical conductors in the slots by passing them through this rather cramped opening. This results in filling rates of the slots with the electrical conductors remaining relatively low, in particular if the electrical machine is long.

The dimensions of an electrical rotating machine depend on its rated load torque. The higher the rated load torque which a motor is able to produce, the more bulky the electrical motor, all other things being equal.

There are applications for which it is desirable to obtain both high power levels and highly compact constructions of the motor at the same time. To give just one concrete example, when the intention is to install electric traction motors in the wheels of automotive vehicles, it is desirable to be able to develop power levels of at least 10 kW per motor, and even at least 25 or 30 kW per motor for the majority of the time, for a weight as low as possible in order not to make the unsprung masses too heavy. It is also desirable for the bulk to be very small, not going beyond or going beyond by as little as possible the internal volume of the wheel so that it does not interfere with the elements of the vehicle in the event of flexing of the suspension and in the event of other types of movement of the wheel with respect to the vehicle body.

These two requirements (high power level and low weight and bulk) make it very problematic to install electric traction motors in the wheels of private vehicles without radically improving the ratio of weight to power of the electrical machines currently available on the market.

SUMMARY OF THE INVENTION

The object of the invention is to facilitate and optimize the construction of electric motors. This is most particularly important if the intention is to increase the specific power of an electrical rotating machine, that is to say the mechanical power that a motor is capable of developing for a given overall mass or the electrical power that an alternator is capable of delivering for a given overall mass.

The invention relates to electrical machines in which the stator magnetic circuit is made in two parts: an internal part comprising the teeth, and an external part covering the teeth and slots. In this magnetic circuit, each tooth separating two slots does not form a continuous piece with the outside periphery of the magnetic circuit. It goes without saying that the magnetic circuit is laminated and is made from ferromagnetic metal sheets for reasons well known to those skilled in the art. It is thus possible to form a core comprising the internal part of the magnetic circuit, on which the conductive wires can be wound in the slots, with access to these slots being from the outside. Then, the internal part is covered by the external part to complete the magnetic circuit.

In a first aspect, the invention proposes an electrical rotating machine comprising an external stator and a rotor having a geometrical axis of rotation and disposed inside the stator, the said stator comprising a laminated magnetic circuit having:

a stack of yokes each made from a magnetic metal sheet and disposed substantially parallel to a plane perpendicular to the axis, the stack forming an external covering;

a plurality of teeth disposed inside the covering, protruding towards the inside, the teeth each being made from a magnetic metal sheet and disposed substantially parallel to a plane perpendicular to the axis, the teeth being stacked and the stacks of teeth delimiting slots, the teeth being bound to the covering;

the slots being delimited on the radially outer side by the yokes, the slots being delimited in the circumferential direction by the side walls of the teeth, electrically conductive wires being disposed in the slots, and in which the covering is mounted such that it is bound to a sheath surrounding the covering on the outside thereof, a circuit intended for a cooling liquid being made in the said sheath.

One object of the invention is at the same time to improve dissipation to the outside of the heat generated by the motor. The invention proposes using a cooling circuit by means of ducting in which a liquid coolant circulates, which, despite the thermal resistance owing to the stator magnetic circuit in two parts, which allows better filling of the slots by the copper, enables the heating of the motor to be sufficiently limited and thus allows good efficiency and/or an increased specific power to be achieved.

To construct machines of very high power per unit mass, and/or to construct machines with very good efficiency, it is advantageous to fill the available section of the slot with copper to the maximum extent. With a given slot section, an increase in the section of copper brings about a decrease in Joule's loss for a given current (and thus torque). Moreover, there is less heating. The efficiency of the machine is thus improved. In accordance with a different approach, at a given maximum permissible temperature, the corresponding current is larger (and thus the torque is greater), which improves the ratio of weight to power of the machine.

Consider also that for a given section of copper the section of the slot can be reduced and thus the mass of the ferromagnetic circuit is reduced. In fact, all other things being equal, in particular the maximum permissible temperature within the machine, it is possible for example to reduce the height (dimension measured in the radial direction) of the slots. The mass of the ferromagnetic circuit has been reduced, the losses in the ferromagnetic circuit are thus decreased, and consequently the specific power of the machine and its efficiency are improved.

According to a second aspect, the invention proposes an electrical rotating machine comprising an external stator and a rotor having a geometrical axis of rotation and disposed inside the stator, the said stator comprising a laminated magnetic circuit having:

- a stack of yokes each made from a magnetic metal sheet and disposed substantially parallel to a plane perpendicular to the axis, the stack forming an external covering;
- a plurality of teeth disposed inside the covering, protruding towards the inside, the teeth each being made from a magnetic metal sheet and disposed substantially parallel to a plane perpendicular to the axis, the teeth being stacked and the stacks of teeth delimiting slots, the teeth being bound to the covering;

the slots being delimited on the radially outer side by the yokes, the slots being delimited in the circumferential direction by the side walls of the teeth, electrically conductive wires being disposed in the slots, and having a stack of star-shaped metal sheets each made from a magnetic metal sheet and disposed substantially parallel to a plane perpendicular to the axis, all the teeth appearing on each star-shaped metal sheet, all the teeth being connected to one another by a partition closing the slot on the radially inner side of the slot.

According to this second aspect of the invention, it is proposed that a motor be constructed in such manner that the slots are not open towards the air gap separating the rotor from the stator. The torque created in the motor is the result of the interaction between the flux created at the rotor (by the magnets or the electromagnets in the case of a synchronous machine) and the flux created at the stator by the circulation of current in the windings of the stator. The lines of flux coming from the rotor must encompass the flux created at the stator. It is commonly recognised that this result is obtained because the base of the slots of the stator is open towards the axis of the electrical machine, which prevents a magnetic short-circuit for the flux coming from the magnets or coming from the windings of the stator. Moreover, to improve the mechanical behaviour of the copper in the slots, it is conventional to provide feet on the slots. These must be sufficiently thick, typically in the order of 0.7 to 0.9 mm, or else the feet on the slots will be too fragile to contain the copper wires inside the slot.

Contrary to the usual design, in this aspect of the invention, the feet on the slots are closed by the magnetic circuit over the entire inside periphery of the stator. A very thin partition on the radially inner side of the slot, for example less than 0.5 mm thick, and preferably less than 0.4 mm thick, is sufficient to give it a very high level of mechanical strength, because the partition is continuous. Because of its thinness, a very high level of magnetic saturation is obtained. The result is that the leakage flux passing across this partition remains very small and has no noticeable effect on the motor torque. Moreover, because the partition is thinner at the foot on the slot than in conventional arrangements for slot feet of open slots, the result is a gain in the slot section available for installing the copper. It is thus possible to install more copper, all other things being equal.

As already explained, to construct machines of very high power per unit mass, it is advantageous to fill the available section of the slot with copper to the maximum extent, and this is facilitated by the invention. All other things being equal, in particular the level of saturation in the magnetic circuit, the height of the slots can be reduced.

The invention will be better understood from the non-restrictive description which follows and which is given with reference to the attached drawings.

DESCRIPTION OF THE DRAWINGS

FIG. 8 illustrates a later phase of manufacture of the internal part of the magnetic circuit;

DESCRIPTION OF PREFERRED EMBODIMENTS

Figure 1:
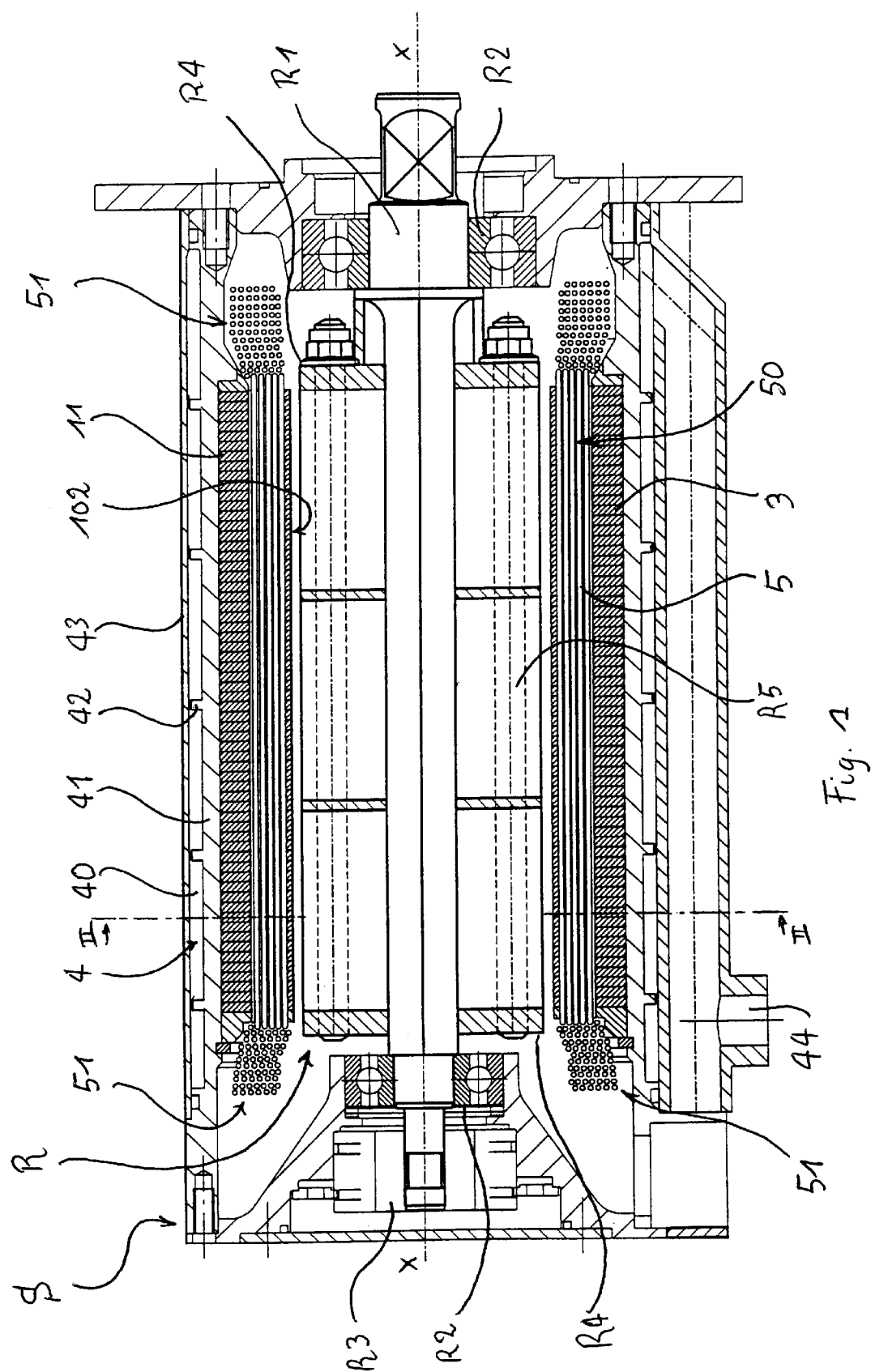
FIG. 1 is a section showing an overall view of an electrical rotating machine according to the invention, the section being taken along the plane of section I—I in FIG. 2, passing through the axis of the rotating machine.

FIG. 1 shows an electrical machine containing a stator S and a rotor R which are separated by a very small air gap, this figure being a section along a plane containing the axis XX. The geometric axis XX is the axis of rotation of the rotor. The rotor R has a shaft R1 mounted in the stator S by means of two bearings R2. Also shown is an encoder/resolver R3 mounted at one end of the shaft R1. On either side of the shaft R1, in the axial direction, there is shown a lateral end plate R4, located on either side of pole pieces. A tie rod R5 passes through each pole piece and allows these to be clamped between the end plates R4. Permanent magnets (not shown) are disposed in the seatings between the pole pieces. For more details on the construction of the rotor illustrated, reference can be made to patent application EP 1 001 507. This, however, is only a non-restrictive example of a rotor which may be associated with the stator proposed by the present invention.

Figure 3:
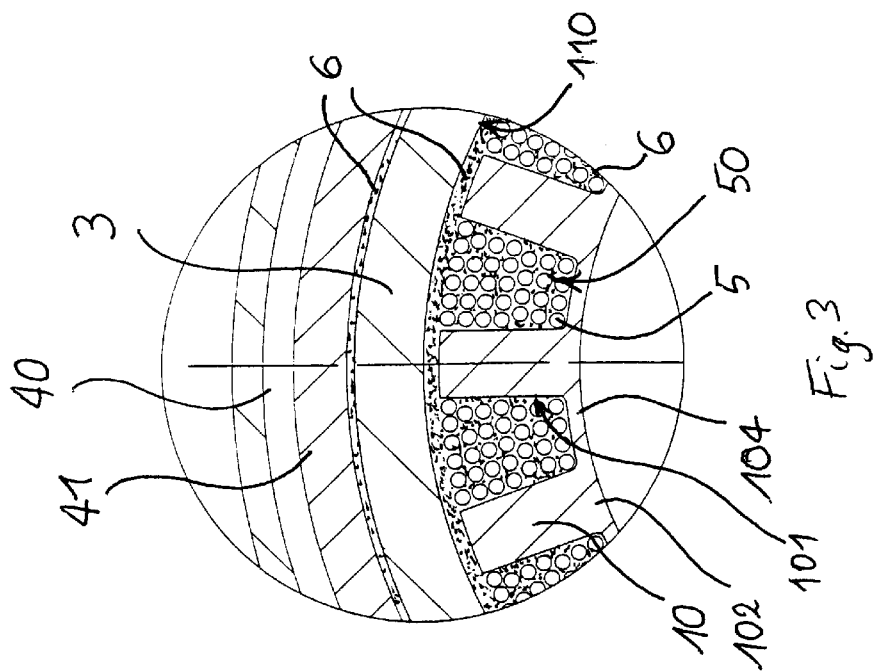
FIG. 3 is an enlargement of the zone identified by the circle III in FIG. 2.
Figure 2:
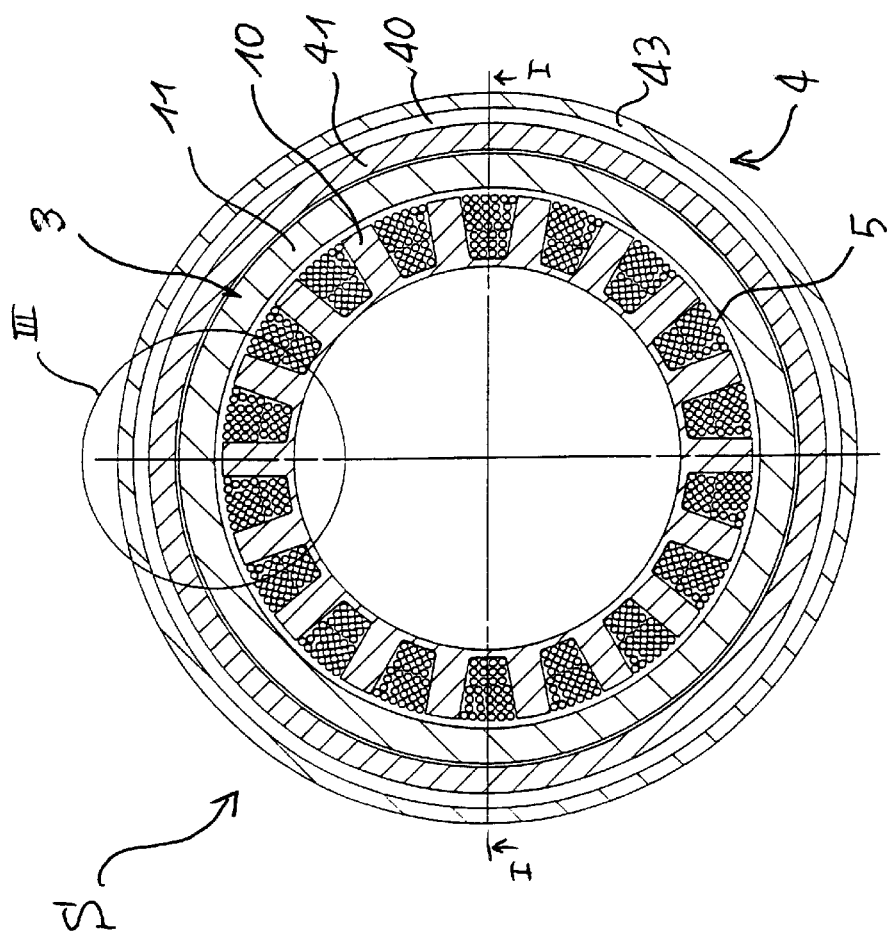
FIG. 2 is a section along the plane of section II—II in FIG. 1, perpendicular to the axis of the rotating machine, illustrating the stator of the machine according to the invention.

A stack of yokes 11, which are each made from a magnetic metal sheet and disposed substantially parallel to a plane perpendicular to the axis, is shown in FIGS. 2 and 3. The stack of yokes 11 forms an external covering 3. A plurality of teeth 10 disposed inside the external covering 3 can be seen. The teeth 10 are disposed substantially radially and delimit slots 50 containing copper wires 5 forming the stator windings.

The shape and size of the different teeth are determined by electromagnetic considerations. The shape and size of the slots are themselves determined by the number, shape and section of the conductors which are to be installed. The teeth are also each made from a magnetic metal sheet and disposed substantially parallel to a plane perpendicular to the axis. The metal sheets of the teeth 10 are not necessarily disposed congruently with respect to the metal sheets of the yokes 11.

On the radially outer side of the slots 50 there can be seen the radially inner walls 110 of the yokes 11. In the peripheral direction on either side of the slots there can be seen the side walls 101 of the teeth 10. The electrically conductive wires 5 disposed in the slots are impregnated with an impregnating resin 6. In FIG. 3, it is seen that the same resin 6 is placed between each tooth 10 and each yoke 11. The teeth are thus bound to the external covering by gluing. Gluing is just one advantageous form of embodiment. The elements can however also be bound to one another by any appropriate means. One could mention for example hooping or the use of mutually matched grooving.

FIG. 3 shows more particularly one aspect of the invention, according to which the radially inner ends 102 of all the teeth 10 are connected to one another by a partition 104, which closes off the radially inner end of each slot 50. In this variant embodiment, the section of the slots 50 through a plane perpendicular to the axis is thus completely closed.

The external covering 3 is mounted such that it is bound to a sheath 4 surrounding the covering on the outside thereof. A circuit 40 intended for the circulation of cooling liquid is made in the sheath 4 (see also FIG. 1). To this end, the sheath 4 is formed by an inner jacket 41, having on its outer surface a thread 42 and an outer jacket 43. The circuit 40 is thus constructed between the inner jacket 41 and the outer jacket 43 and by the thread 42, creating a circuit in a coil shape. One of the apertures 44 allowing the motor to be connected to a source of cooling fluid is shown.

The sheath 4 is bound to the covering 3 by gluing provided by the same resin 6 as the impregnating resin. Gluing is just one advantageous form of embodiment. The elements can however also be bound to one another by any appropriate means. One could mention for example hooping, screwing or the use of mutually matched grooving.

Figure 5:
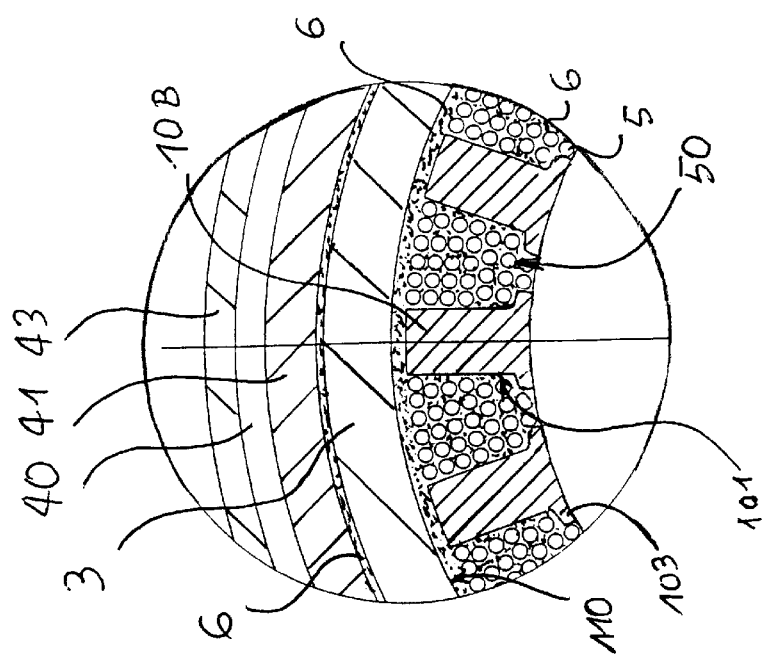
FIG. 5 is an enlargement of the zone identified by the circle V in FIG. 4.
Figure 4:
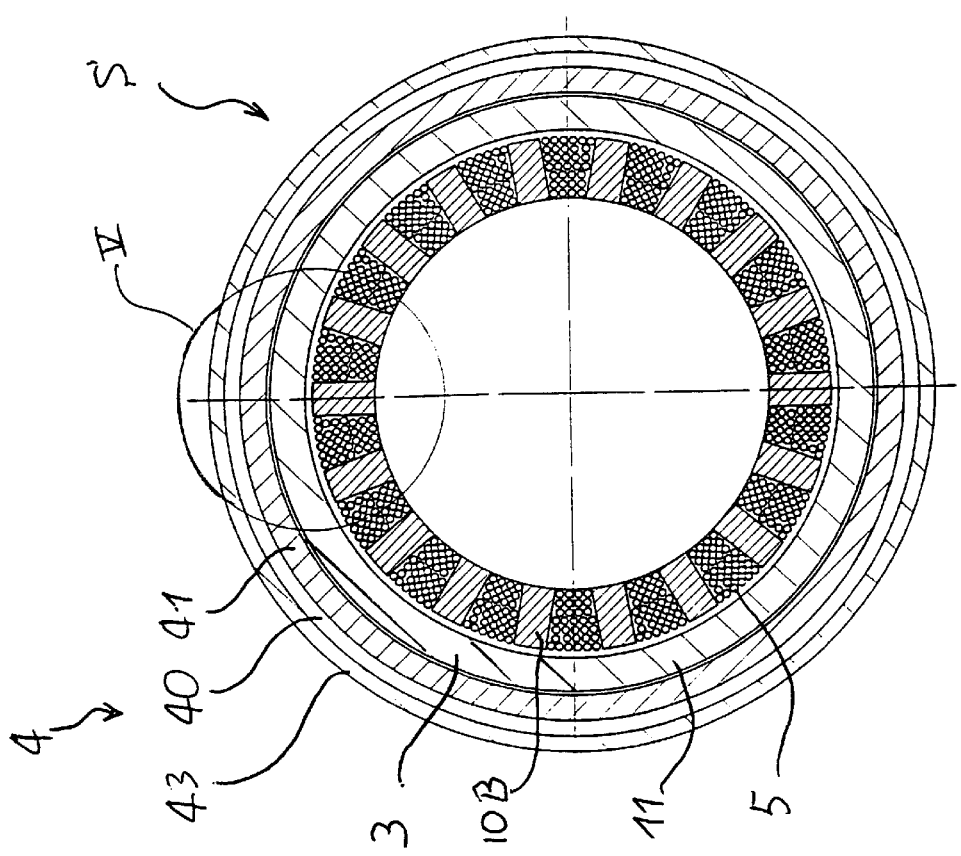
FIG. 4 is a section comparable to that in FIG. 2, illustrating a variant embodiment of the invention.

According to another aspect of the invention, illustrated in FIGS. 4 and 5, the slots 50 are open on the radially inner side. The teeth 10B are not connected to one another. In FIG. 5, feet 103 on the slots are shown (not shown in FIG. 4 for sake of simplicity). Since all the other aspects are identical to what was illustrated in FIGS. 1 to 3, the same references have been used in FIGS. 4 and 5. The external covering 3 is mounted such that it is bound to a sheath 4 surrounding the covering on the outside thereof. It is possible to create a circuit 40 intended for the circulation of a cooling liquid in the sheath 4 independently of the use of a partition closing the slots on the side with the air gap between the rotor and the stator.

By comparison with the layout known from the prior art, and taking as a comparison an identical slot volume and one stage in manufacture of the stator, as will be explained in more detail below, the slots are open towards the outside instead of being open towards the inside. This radically simplifies the installation of electrical conductors in the slots. The slot is much more accessible by way of an outside opening (those skilled in the art will immediately appreciate that slots which are accessible by way of an outside opening are much more convenient to fill with conductors than slots accessible by way of an inside opening). Moreover, taking a comparable slot section, the dimension of the slot opening may be much bigger on the radially outer side. Because the side walls of the teeth may be planar, the dimension of the slot opening may reach that of the width of the slot at its largest radius. Thus, the width of the slots 50, as measured between the side walls of adjacent teeth 10, does not diminish from the radially inner side of the slot to the inner wall 110 on the covering 3—a non-restrictive but advantageous aspect.

Since the conditions of installing the conductors in their slots have been radically simplified, one can readily conceive of different manual and/or automatic methods for mass production in order to carry out the installation proper of the conductors. Possible methods include winding an individual conductor or installing sections or indeed working on pre-matched groups of conductors, or any other appropriate method.

Figure 10:
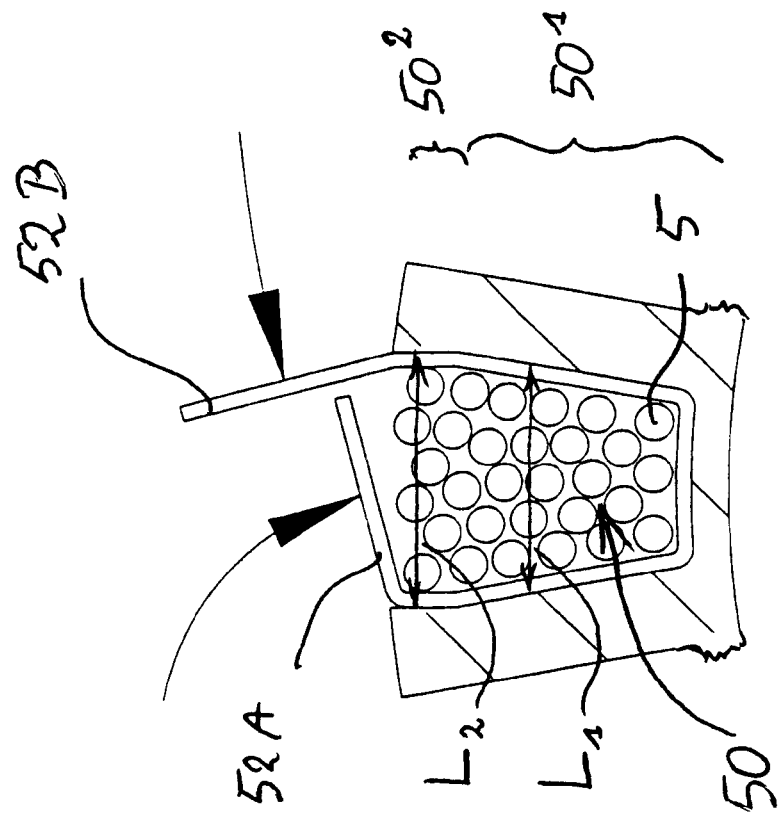
FIGS. 9 and 10 illustrate two stages in making a variant embodiment of the invention.
Figure 9:
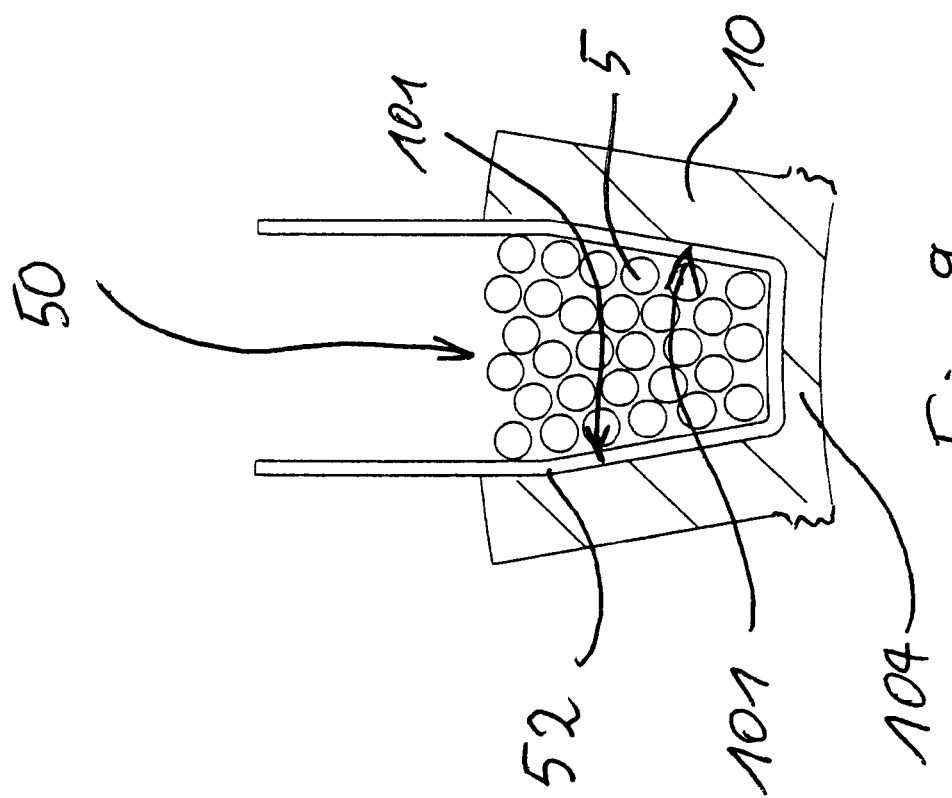

In an advantageous but non-restrictive manner, as illustrated in FIGS. 9 and 10, the slots 50 have, as seen from the radially inner side of the slot to the wall of the covering, a first part $50^1$ in which the width $L_1$ of the slots 50 increases and a second part $50^2$ in which the width $L_2$ of the slots 50 is substantially constant. This fact promotes the retention of the wires 5 in the slots 50 as the winding or windings are made in situ by radially inserting the sections of wire 5 in the slots starting from the outside space, as explained in detail below.

The main stages of the process of manufacturing a stator of an electrical rotating machine having a laminated magnetic circuit supporting windings are as follows:

cutting to star-shape metal sheets having a circular base and radial teeth protruding towards the outside and forming a single piece with the base, stacking these metal sheets onto a sleeve such that the teeth are superposed and a core is obtained which has, between the teeth, slots open towards the outside, winding the conductive wires in the slots, and moreover cutting to annular shape metal sheets for the yokes, the dimensions of the yoke metal sheets and the star-shaped metal sheets being adapted to one another where necessary, stacking the yokes such that an external covering is obtained, then assembling the core supporting the windings and the external covering and binding them, removing the sleeve, machining the bases in order to adjust the internal diameter of the stator.

Figure 7:
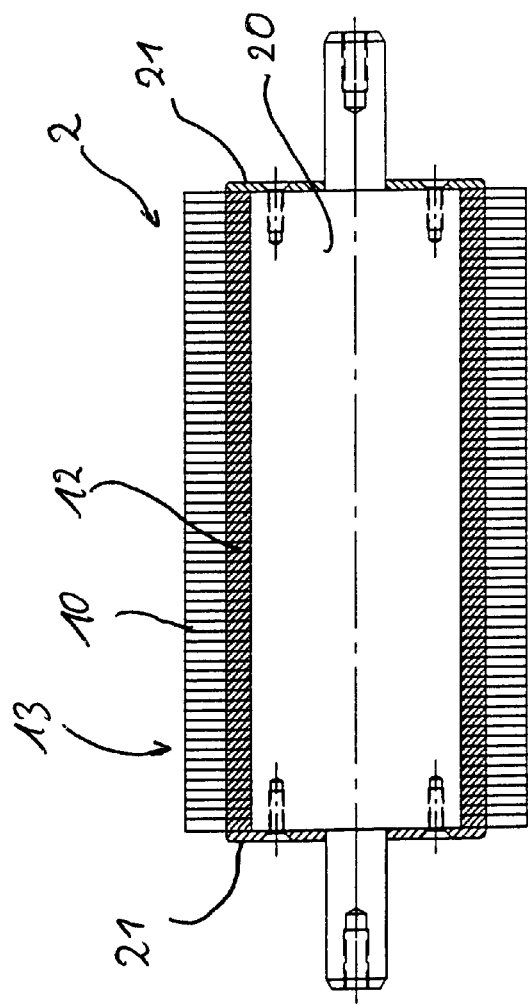
FIGS. 6 and 7 are views of a component and a section of assembled components which illustrate an initial phase of manufacture of the internal part of the magnetic circuit.
Figure 6:
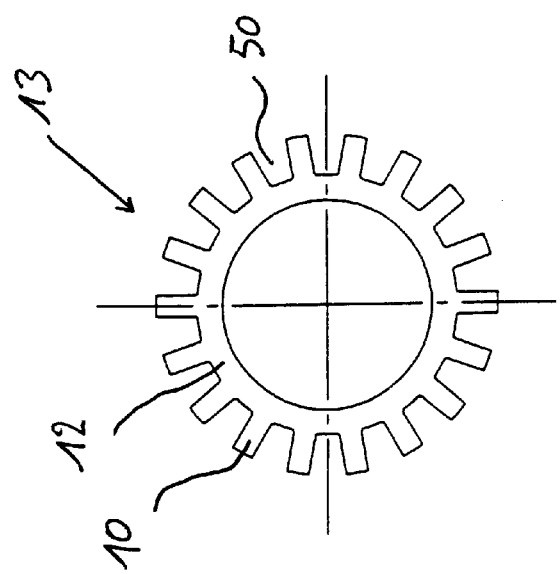

In FIG. 6, there is seen a cut-out star-shaped metal sheet 13, having a circular base 12 and radial teeth 10 protruding towards the outside and forming a single piece with the base. In FIG. 7, there is seen a sleeve 20 onto which the star-shaped metal sheets 13 have been pushed and are held fixed in place by being clamped between two end plates 21. When the star-shaped metal sheets 13 are mounted, the metal sheets are oriented such that the teeth 10 are superposed and a core 2 is obtained which has, between the teeth 10, slots 50 open towards the outside. It goes without saying that the teeth 10 may be offset slightly from one another in order to create slot skewing as is well known by those skilled in the art. It is then possible, if necessary, to grind the start-shaped metal sheets 13, as is shown diagrammatically at 22 in FIG. 8.

Figure 11:
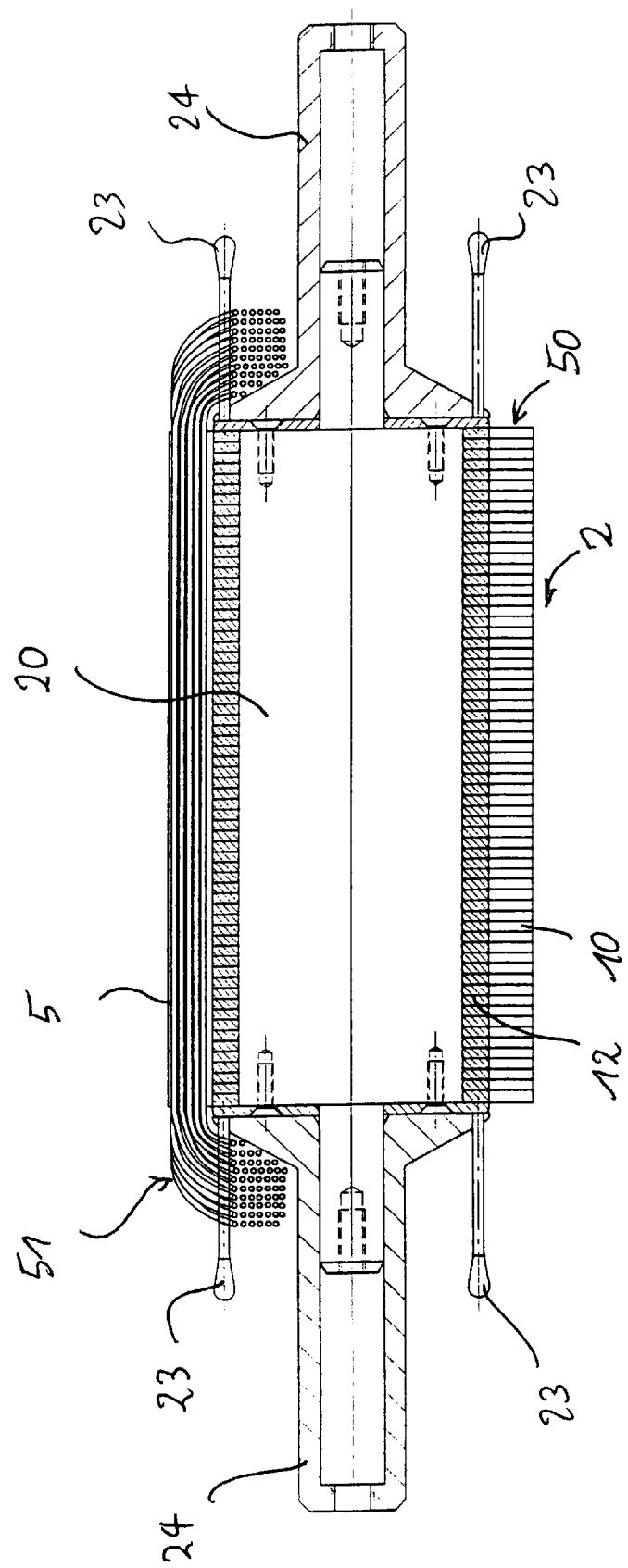
FIG. 11 illustrates the phase of winding.

Then pins 23 are installed (see FIG. 11) on supports 24 centered on the sleeve 20. The pins 23 help to wind the conductive wires 5 in the slots 50, forming winding heads 51 around the pins 23, as illustrated in the upper half of FIG. 11.

As an option, as illustrated in FIGS. 9 and 10, it is also possible at this stage to cover the inner walls of the partitions 104 and side walls 101 of the teeth 10, that is to say the inner walls of the slots 50, with an insulating foil 52. In this case, there is provided a stage of inserting an insulating foil 52 in each slot 50 before winding conductive wires 5 in the slots 50. The edges 52A and 52B of each insulating foil project radially upwards from the teeth 10. The edges 52A and 52B are turned back onto the winding after the latter has been formed and before assembly the core 2 with the external covering 3. After this turning back, the said edges 52A and 52B partly overlap one another. It goes without saying that this insulating foil 52 may be used independently of the shape of the slot, the width whereof varies as explained above, and as can be seen in these same FIGS. 9 and 10.

Before or after winding it is possible to slightly offset the teeth 10 from one another in order to create slot skewing, as is also well known by those skilled in the art.

Figure 13:
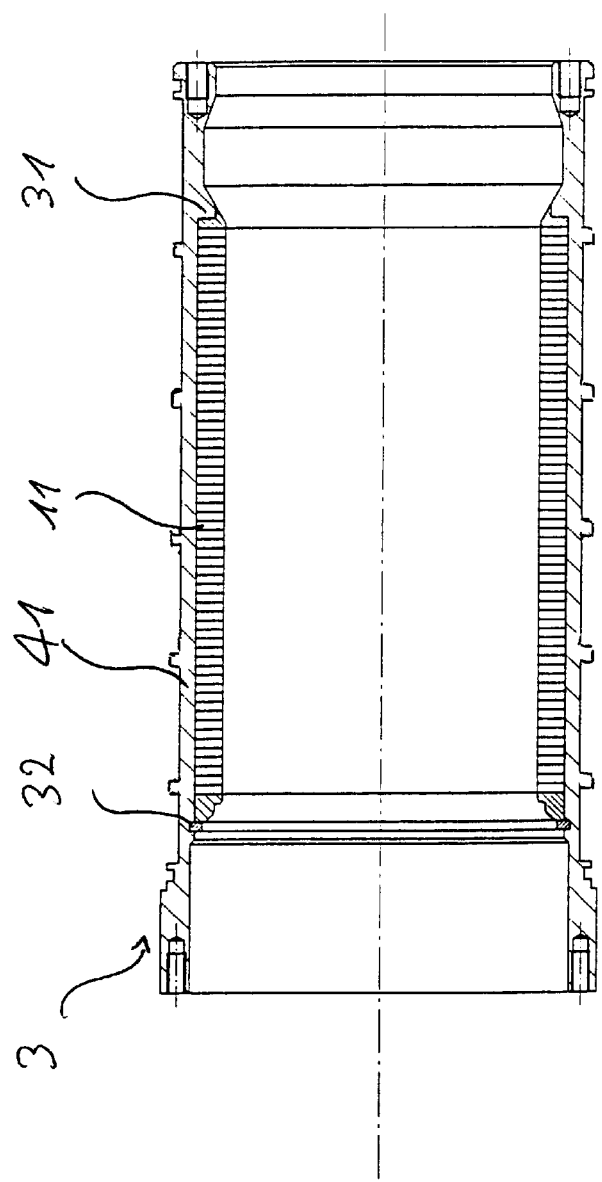
FIGS. 12 and 13 are views of a component and a section of assembled components, respectively, which illustrate an initial phase of manufacture of the external part of the magnetic circuit.
Figure 12:
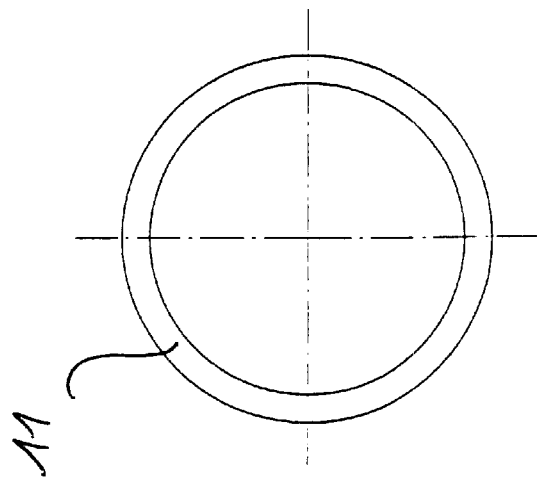

In parallel with the operations which have just been described, the other part of the stator magnetic circuit is prepared. In FIG. 12, a metal sheet yoke 11, in annular cut out shape, is seen. These yokes 11 are cut to shape such that they can be matched to the outside of the star-shaped metal sheets 13, preferably with slight play with a view to later binding by gluing with resin. In FIG. 13, it can be seen that the yokes 11 are pushed into the inner jacket 41 and are held fixed between a shoulder 31 and a circular clip 32. When the yokes 11 are mounted, the sheets are oriented substantially parallel to a plane perpendicular to the axis.

Figure 14:
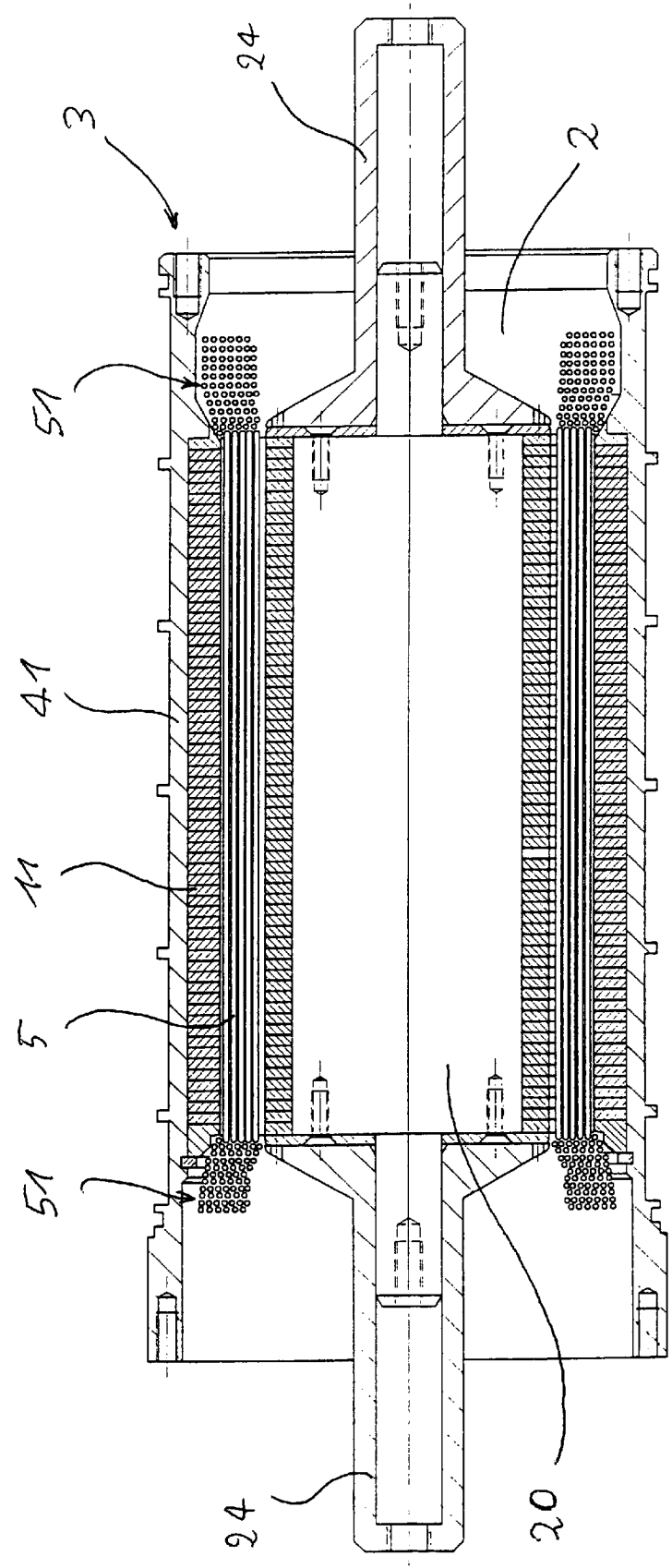
FIG. 14 illustrates the assembly of the two parts forming the stator.

Stacking of the yokes 11 allows an external covering 3 which completes the stator magnetic circuit to be obtained. To this end, and as shown in FIG. 14, the core 2 supporting the windings and the covering 3 are assembled. After removal of the pins 23, the winding heads 51 are removed by flattening them towards the inner jacket 41, and the supports 24 are removed in order to free the space required by the rotor and to arrive at the configuration shown in FIG. 14, which shows the two parts of the magnetic circuit assembled, namely the core 2 and the covering 3 having the yokes 11. It is then possible to bind all these elements by gluing with resin 6 in a stage comprising impregnating the conductors 5 in the slots with resin. This impregnation stage, which is known per se to those skilled in the art, here fulfils an additional function: it binds the teeth 10 and the yokes 11. The teeth and yokes, which were manufactured separately, are in fact bound to one another, advantageously as proposed, when the core 2 is mounted in the covering 3. The impregnation also ensures that the covering 3 is bound by gluing inside the sheath 4.

Once the sleeve 20 in FIG. 14 has been removed, it is possible to carry out machining in order to free an internal opening for the different slots. However, it has been found that a partition of small dimensions providing a mechanical connection between the different teeth on the inner side is irrelevant as regards the magnetic circuit, since as long as the ferromagnetic metal sheet remaining on the inner side of the different slots is sufficiently thin, magnetic saturation is achieved rapidly, such that this is no hindrance to the proper functioning of the electrical machine.

In general, in order that the core has the mechanical strength necessary for the parts as a whole to withstand the manufacturing stages without damage, excess material will have been provided in the base 12 of the star-shaped metal sheets 13. The stage of machining has the object of eliminating enough material in order to suppress magnetic short-circuiting through the base 12, but not necessarily all the material, as shown in FIGS. 2 and 3. The bases are machined such that the internal diameter of the stator is adjusted as desired (in dependence on the dimension of the rotor).

The invention can be used equally well to produce electric motors or indeed alternators.

We claim:

1. An electrical rotating machine comprising an external stator and a rotor having a geometrical axis of rotation and disposed inside the stator, said stator embodying a laminated magnetic circuit comprising:
   an axial stack of yokes, each yoke being made from a magnetic metal sheet and being disposed substantially parallel to a plane perpendicular to the axis, the stack forming an external covering;
   a plurality of teeth disposed inside the covering, protruding radially towards the inside, the teeth each being made from a magnetic metal sheet and disposed substantially parallel to a plane perpendicular to the axis, the teeth being axially stacked and the stacks of teeth axially-extending delimiting slots, the teeth being bound to the covering;
   the slots being delimited on the radially outer side by the yokes, the slots being delimited in the circumferential direction by the side walls of the teeth, electrically conductive wires being disposed in the slots, and wherein the covering is mounted such that it is bound to a sheath surrounding the covering on the outside thereof, a circuit for a cooling liquid being provided in said sheath.

2. An electrical rotating machine according to claim 1, including an axial stack of star-shaped metal sheets, each made from a magnetic metal sheet and disposed substantially parallel to a plane perpendicular to the axis, all the teeth appearing on said star-shaped metal sheets, all the teeth on the same sheet being connected to one another by a partition closing the slot on the radially inner side of the slot.

3. An electrical rotating machine according to claim 2, in which the partition on the radially inner side of the slot is less than 0.5 mm thick.

4. An electrical rotating machine according to claim 2, in which the partition on the radially inner side of the slot is less than 0.4 mm thick.

5. An electrical rotating machine according to claim 1, in which the teeth are bound to the external covering by gluing.

6. An electrical rotating machine according to claim 5, in which an impregnating resin holds the electrically conductive wires fixed in the slots.

7. An electrical rotating machine according to claim 6, in which the sheath is bound to the covering by gluing and the gluing is provided by the same resin as the impregnating resin.

8. An electrical rotating machine according to claim 5, in which an impregnating resin holds the electrically conductive wires fixed in the slots and the gluing of the teeth to the external covering is provided by the same resin as the impregnating resin.

9. An electrical rotating machine according to claim 1, in which the sheath is bound to the covering by gluing.

10. An electrical rotating machine according to claim 1, in which the width of the slots, as measured between the side walls of adjacent teeth, does not decrease from the radially inner side of the slot to the wall of the covering.

11. An electrical rotating machine according to claim 10, in which as seen from the radially inner side of the slot to the wall of the covering, the slots have a first part in which the width of the slots increases and a second part in which the width of the slots is substantially constant.

12. An electrical rotating machine comprising an external stator and a rotor having a geometrical axis of rotation and disposed inside the stator, said stator embodying a laminated magnetic circuit comprising:

an axial stack of yokes, each yoke being made from a magnetic metal sheet and being disposed substantially parallel to a plane perpendicular to the axis, the stack forming an external covering;

a plurality of teeth disposed inside the covering, protruding radially towards the inside, the teeth each being made from a magnetic metal sheet and disposed substantially parallel to a plane perpendicular to the axis, the teeth being axially stacked and the stacks of teeth delimiting axially-extending slots, the teeth being bound to the covering;

the slots being delimited on the radially outer side by the yokes, the slots being delimited in the circumferential direction by the side walls of the teeth, electrically conductive wires being disposed in the slots, and having a stack of star-shaped metal sheets each made from a magnetic metal sheet and disposed substantially parallel to a plane perpendicular to the axis, all the teeth appearing on said star-shaped metal sheets, all of the teeth on each sheet being connected to one another by a partition closing the slot on the radially inner side of the slot.

13. An electrical rotating machine according to claim 12, in which the covering is mounted such that it is bound to a sheath surrounding the covering on the outside thereof, a circuit intended for the circulation of cooling liquid being provided in the said sheath.

14. An electrical rotating machine according to claim 13, in which the sheath is bound to the covering by gluing.

15. An electrical rotating machine according to claim 12, in which the partition on the radially inner side of the slot is less than 0.5 mm thick.

16. An electrical rotating machine according to claim 12, in which the partition on the radially inner side of the slot is less than 0.4 mm thick.

17. An electrical rotating machine according to claim 12, in which the teeth are bound to the external covering by gluing.

18. An electrical rotating machine according to claim 17, in which an impregnating resin holds the electrically conductive wires fixed in the slots.

19. An electrical rotating machine according to claim 18, in which the sheath is bound to the covering by gluing and the gluing is provided by the same resin as the impregnating resin.

20. An electrical rotating machine according to claim 17, in which an impregnating resin holds the electrically conductive wires fixed in the slots and the gluing of the teeth to the external covering is provided by the same resin as the impregnating resin.

21. An electrical rotating machine according to claim 12, in which the width of the slots, as measured between the side walls of adjacent teeth, does not decrease from the radially inner side of the slot to the wall of the covering.

22. An electrical rotating machine according to claim 21, in which as seen from the radially inner side of the slot to the wall of the covering, the slots have a first part in which the width of the slots increases and a second part in which the width of the slots is substantially constant.

* * * * *

UNITED STATES PATENT AND TRADEMARK OFFICE
CERTIFICATE OF CORRECTION

| | | |
|---|---|---|
| PATENT NO. | : 6,657,356 B2 | Page 1 of 1 |
| APPLICATION NO. | : 09/907285 | |
| DATED | : December 2, 2003 | |
| INVENTOR(S) | : Daniel Laurent et al. | |

It is certified that error appears in the above-identified patent and that said Letters Patent is hereby corrected as shown below:

ON THE TITLE PAGE [74]:

Attorney, Agent, or Firm, insert: --(74) Attorney, Agent, or Firm - Fitzpatrick, Cella, Harper & Scinto--.

ON THE TITLE PAGE [56] REFERENCES CITED:

U.S. Patent Documents, insert: --2,607,816  8/1952  Ryder et al.
                                         4,015,154  3/1977  Tanaka et al.
                                         5,220,233  6/1993  Birch et al. --;
    Foreign Patent Documents, insert: --FOREIGN PATENT DOCUMENTS
                                             JP  57-091646  6/1982
                                             EP  0849857   6/1998
                                             EP  0967708   12/1999        --; and
    Other Publications, insert: --OTHER PUBLICATIONS
                                   English-language Abstract for JP 57-091646--.

Signed and Sealed this

Thirty-first Day of July, 2007

JON W. DUDAS
*Director of the United States Patent and Trademark Office*